(12) United States Patent
Speer et al.

(10) Patent No.: US 7,353,842 B2
(45) Date of Patent: Apr. 8, 2008

(54) AIR FITTING WITH AN INTEGRAL CHECK VALVE

(75) Inventors: Thomas E. Speer, Springfield, OH (US); Richard C. Pickering, Urbana, OH (US); Fredrick C. Gochenouer, Mechanicsburg, OH (US)

(73) Assignee: Q3JMC, Inc., Urbana, OH (US)

( * ) Notice: Subject to any disclaimer, the term of this patent is extended or adjusted under 35 U.S.C. 154(b) by 317 days.

(21) Appl. No.: 10/953,302

(22) Filed: Sep. 29, 2004

(65) Prior Publication Data

US 2005/0072477 A1    Apr. 7, 2005

Related U.S. Application Data

(60) Provisional application No. 60/509,092, filed on Oct. 6, 2003.

(51) Int. Cl.
F16K 15/04 (2006.01)
(52) U.S. Cl. ............... 137/539; 137/533.19; 137/538; 251/337
(58) Field of Classification Search ............... 137/535, 137/538–539, 539.5, 540; 251/902, 337
See application file for complete search history.

(56) References Cited

U.S. PATENT DOCUMENTS

| | | | | |
|---|---|---|---|---|
| 2,710,023 A | * | 6/1955 | Blackford et al. ..... | 137/543.19 |
| 3,324,673 A | * | 6/1967 | Lindahl et al. ............ | 62/196.4 |
| 3,901,475 A | * | 8/1975 | Dreibelbis .................. | 251/360 |
| 3,913,615 A | * | 10/1975 | Cooper .................. | 137/543.19 |
| 4,091,839 A | * | 5/1978 | Donner .................. | 137/533.13 |
| 4,171,712 A | * | 10/1979 | DeForrest ................ | 137/513.5 |
| 4,204,560 A | * | 5/1980 | Eriksen ..................... | 137/508 |
| 4,700,741 A | * | 10/1987 | Murphy .................. | 137/543.19 |
| 4,736,768 A | * | 4/1988 | Tsubouchi et al. ......... | 137/514 |
| 4,776,430 A | * | 10/1988 | Rule .......................... | 184/1.5 |
| 5,566,869 A | * | 10/1996 | Katz ........................ | 224/148.6 |
| 5,622,392 A | | 4/1997 | Gochenouer | |
| 6,227,240 B1 | * | 5/2001 | Wu et al. ............... | 137/543.19 |
| 6,631,929 B1 | | 10/2003 | Pickering | |

* cited by examiner

Primary Examiner—Ramesh Kirshnamurthy
Assistant Examiner—Cloud Lee
(74) Attorney, Agent, or Firm—Schiff Hardin LLP

(57) ABSTRACT

An air fitting with an integral check valve includes a housing having an inlet and at least one outlet, a passage extending between the inlet and the at least one outlet with a valve seat being formed in the passage adjacent the at least one outlet with a portion between the outlet and the valve having a plurality of channels separated by lands which form a guide surface for the valve as it is being forced onto the valve seat by a spring. The channels allow passage of air around the valve member with less restriction when the valve member is lifted off the valve seat.

16 Claims, 5 Drawing Sheets

AIR FITTING WITH AN INTEGRAL CHECK VALVE

REFERENCE TO PROVISIONAL APPLICATION

This application claims benefit of the filing date of U.S. Provisional Application 60/509,092, filed Oct. 6, 2003.

BACKGROUND OF THE INVENTION

In air brake systems, a drop-in air brake fitting is used in the lines leading from an air source, such as a wet tank, to either the primary or secondary air chambers of the brake system. To prevent loss of pressure in the primary and secondary air chambers, if there is a leak in the system, such as at the wet tank, a one-way check valve is usually assembled on the fitting. Currently, one-way check valves, which are designed and manufactured for truck air brakes are either machined out of brass or molded out of plastic to have a smooth, cylindrical bore and then a spring and valve member are assembled in the bore.

SUMMARY OF THE INVENTION

An object of the present invention is to provide an improved drop-in air brake fitting with an integral check valve. The air brake fitting with an integral check valve comprises a housing having an inlet and at least one outlet, a passage extending between the inlet and the at least one outlet, said passage adjacent the at least one outlet having a first portion of a first diameter and a second portion of a second diameter larger than the first diameter to form a valve seat facing the at least one outlet, a valve member having a diameter being disposed in the second portion, a spring biasing the valve member against the valve seat and a retainer holding the spring in the second portion, said second portion having a plurality of land separated by channels extending along the length of the second portion with the land defining a diameter substantially the same as the diameter of the valve member and the channels allowing passage of the air to the at least one outlet when the valve member is forced off the valve seat.

In one embodiment, the housing is a molded part with the channels and lands being integral part of the second portion of the housing. In a second embodiment, the housing is a machined member, such as a brass housing, and the lands are formed by an insert which is received in the second portion. In both embodiments, the lands guide the valve member as it is being moved into and out of engagement with the valve seat.

The valve member may be a cylindrical member having a portion of a reduced diameter to form a spring guide. In another embodiment, the valve member may be a ball.

The spring retainer may be forced into the second portion and preferably has an opening to allow passage of the air out of the at least one outlet.

The retainer may also have an outer cylindrical rim which has a plurality of spokes extending radially inward to form a hub-like retainer for the spring with the rim having inwardly-facing catch elements which can be snapped into an external groove on the housing of the fitting to hold the retainer in place.

The housing may be a T-shaped fitting with one inlet and two outlets or can be an elbow-shaped member having only a single inlet and a single outlet. The T-shaped member may have both outlets provided with check valves or can be built with only one outlet having the check valve and the other free of any check valves.

DESCRIPTION OF THE PREFERRED EMBODIMENTS

Figure 1:
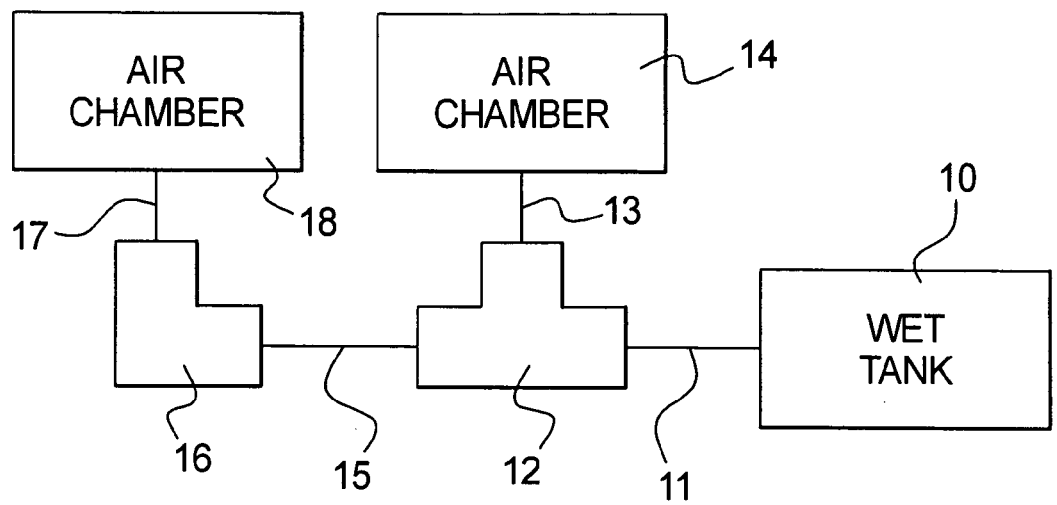
FIG. 1 is a diagram showing air lines from a wet tank to various air chambers utilizing air fitting in accordance with the present invention.
Figure 5:
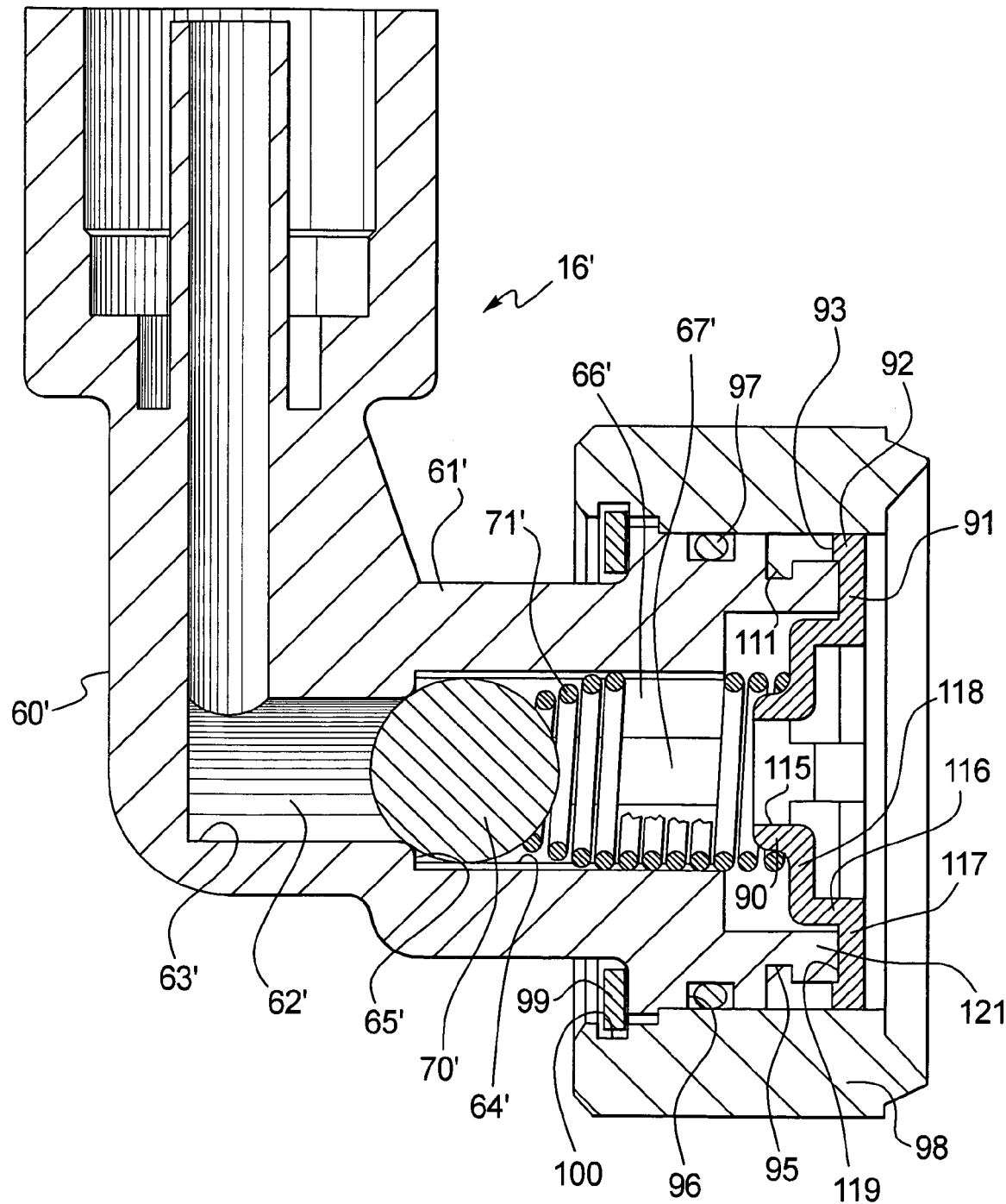
FIG. 5 is a cross-sectional view of an embodiment of an elbow-shaped fitting of the present invention with portions broken away for purposes of illustration.
Figure 8:
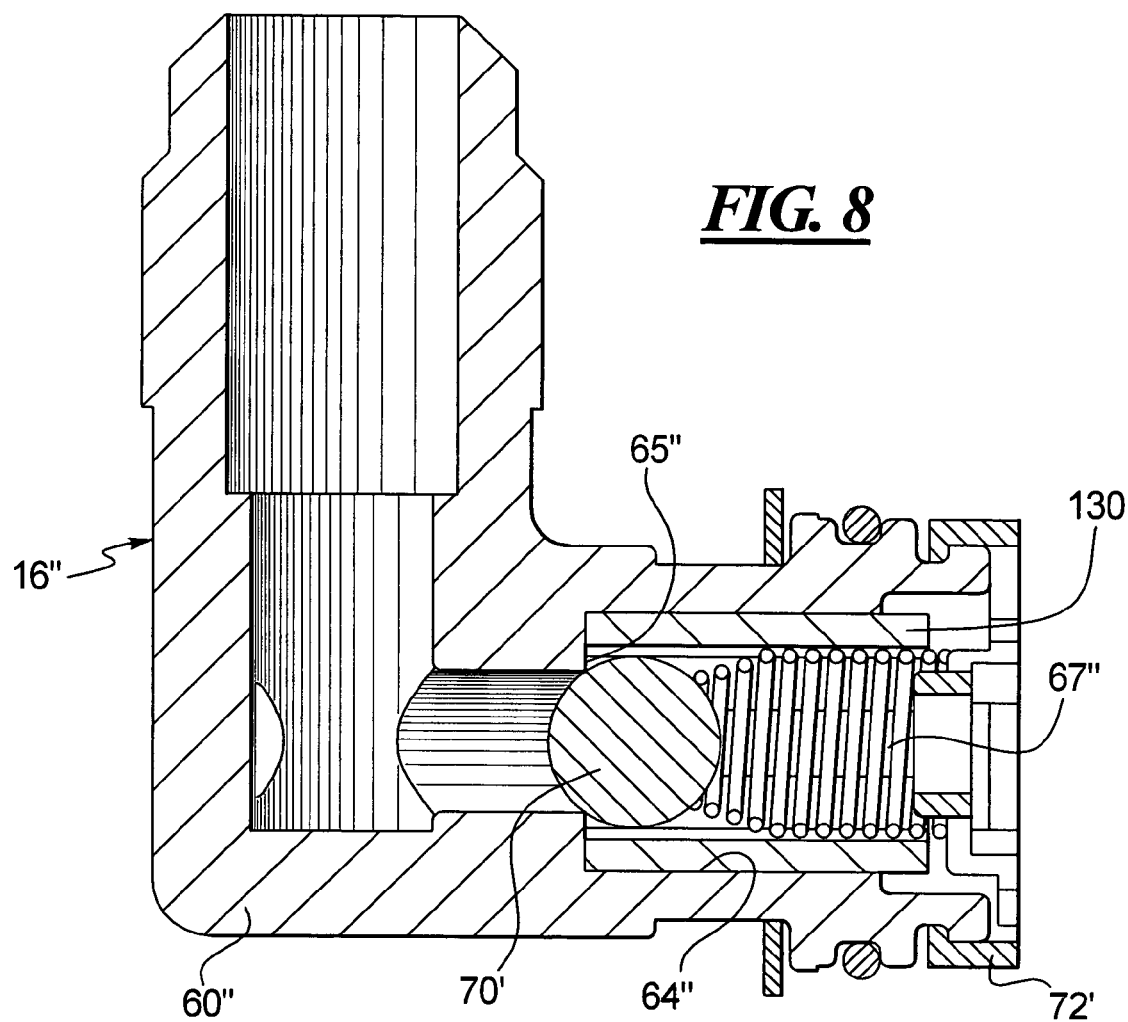
FIG. 8 is a cross-sectional view of yet another embodiment of the elbow fitting in accordance with the present invention.
Figure 9:
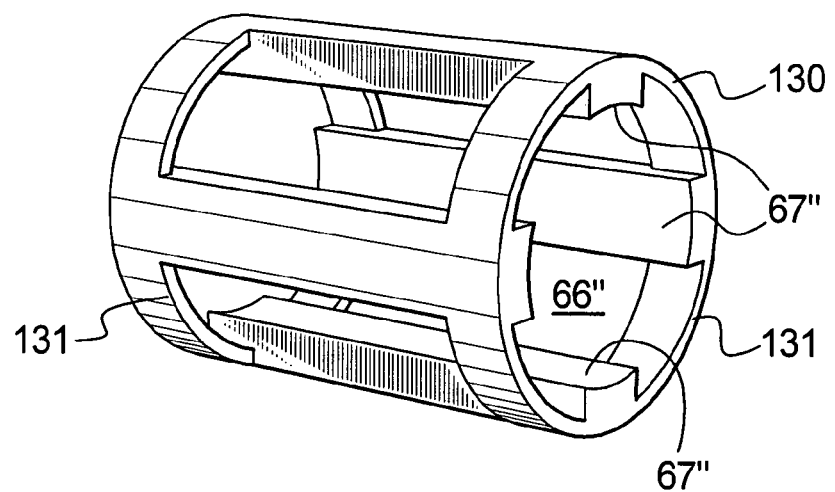
FIG. 9 is a perspective view of an insert providing lands and channels of the present invention for the embodiment of FIG. 8.

The principles of the present invention are particularly useful when incorporated into a fittings 12 or 16 of FIG. 1 and the fittings 16' and 16" of FIGS. 5 and 8.

As illustrated in FIG. 1, in truck air systems, compressed air is fed to a wet tank 10, which removes moisture from the compressed air. Then the air is fed through lines, such as 11, through a fitting 12 to a branch line 13 extending to an air chamber 14, which can be either the primary or secondary chamber for that brake system. From the fitting 12, another line, such as 15, can extend to another fitting similar to the T-shaped fitting 12 or, as illustrated in FIG. 1, goes to an elbow-shaped fitting 16, which has a line 17 going to another air chamber 18 for the system.

Figure 2:
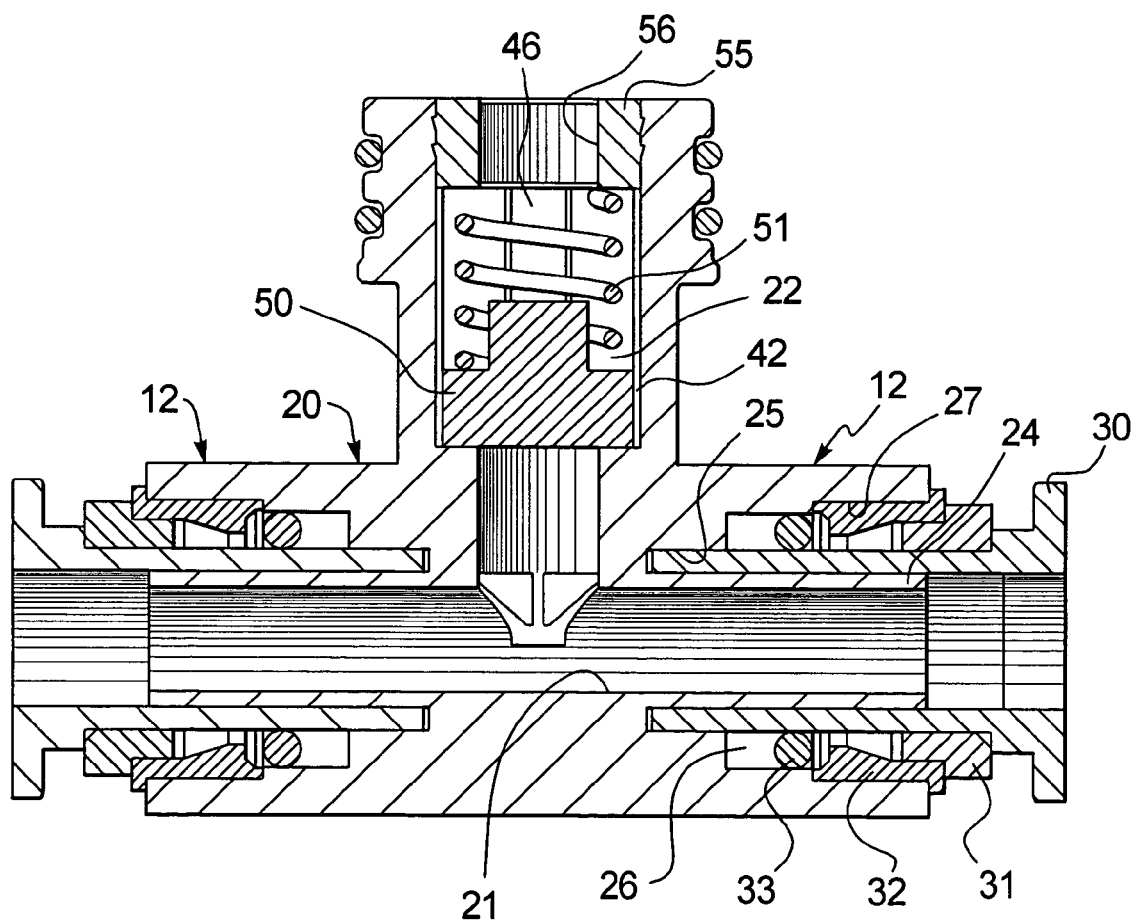
FIG. 2 is a cross-sectional view of a T-shaped air fitting in accordance with the present invention.
Figure 3:
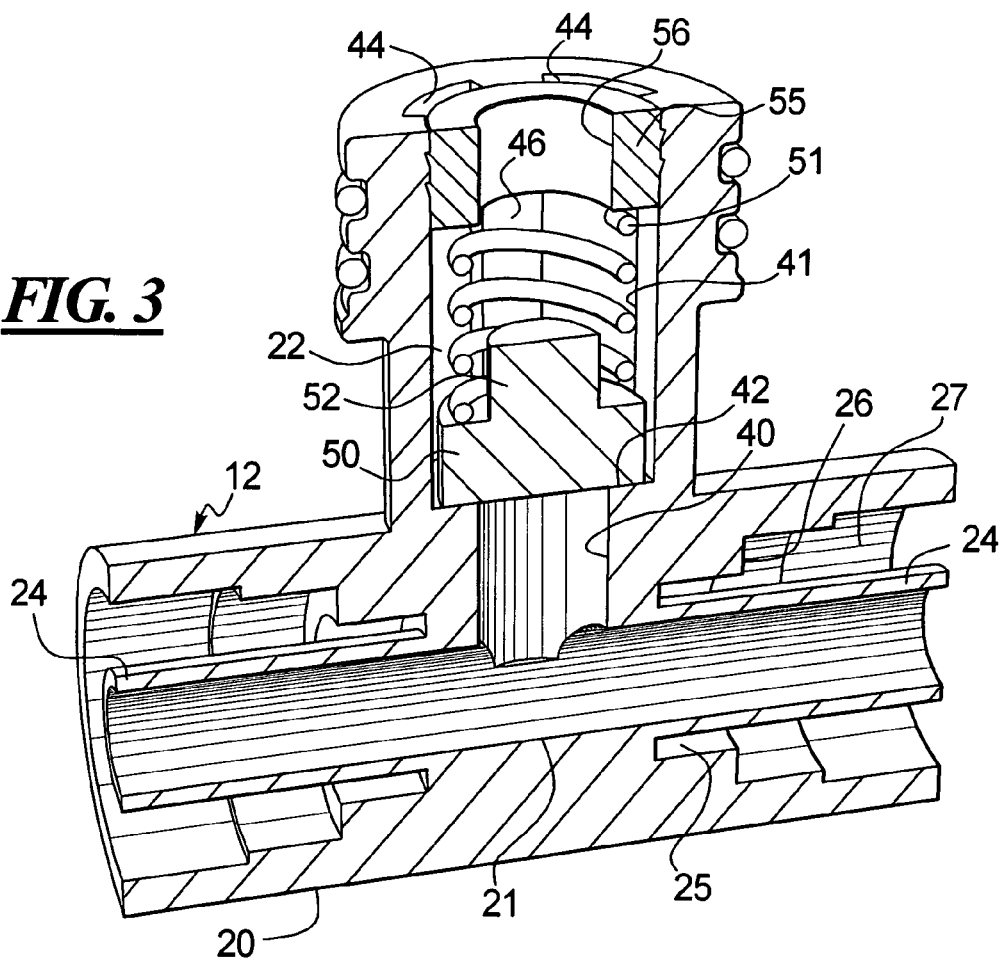
FIG. 3 is a perspective view of the T-shaped fitting of FIG. 2 with portions removed for purposes of illustration.

As illustrated in FIGS. 2 and 3, the T-shaped fitting 12 has a housing 20, which is molded of a plastic material. The housing 20 has a main passage 21 and a branch passage 22, which extends at right angles to the main passage 21. As best illustrated in FIG. 3, the main passage 21, at each end, has an extension 24 which is surrounded by annular chambers 25-27. These chambers, 25-27 receive a plug 30, a collet 31, a sleeve 32 and an O-ring 33, which form a push to connect cartridge assembly for connecting lines, such as 11, to the fitting 12.

The branch passage 22 has a first portion 40 having a first diameter and a second portion 41 having a larger diameter so that a shoulder or valve seat 42 is formed in the passage. As illustrated in FIG. 3, the second portion 41 has a plurality of channels or keyways 44, which are separated from each other by lands or ribs 46 which have arcuate surfaces that form segments of a circle. Preferably, four channels or keyways 44 and four lands are formed in the upper portion 41 and the channels 44 and lands 46 extend along the length of the second portion 41.

To form the integral one-way check valve, a valve member 50, which is a cylindrical member formed of a plastic, such as an elastomer, and has a large diameter portion and a reduced diameter portion 52, which forms a spring guide. A spring 51 is positioned in the portion 41 and has one end surrounding the reduced diameter portion 52 and is held by an annular spring retainer 55. As illustrated, the annular spring retainer 55 has a center opening 56 and is secured in an end of the portion 41 by a forced fit.

An improvement of the valve is the fact that the four lands 46 provide a guide surface of a diameter slightly larger than the outer diameter of the valve member 50. Once the member 50 has been lifted off of the valve seat formed by the shoulder 42 to allow the air to move from the first portion 40 into the section portion 41, the air can move around the valve member through the channels or keyways 44. The previous constructions, which have smooth walls without the keyways or channels 44, have a higher resistance to the flow of the air around the valve member 50 when the member 50 is lifted off of the seat 42. Another advantage of this construction is the fact that the check valve does not add any additional height to the fitting, and the assembly of the check valve is simplified, since it is integral with the fitting.

As illustrated, an outer end of the branch is provided with O-rings and grooves which receive a coupling for the line, such as 13.

Figure 4:
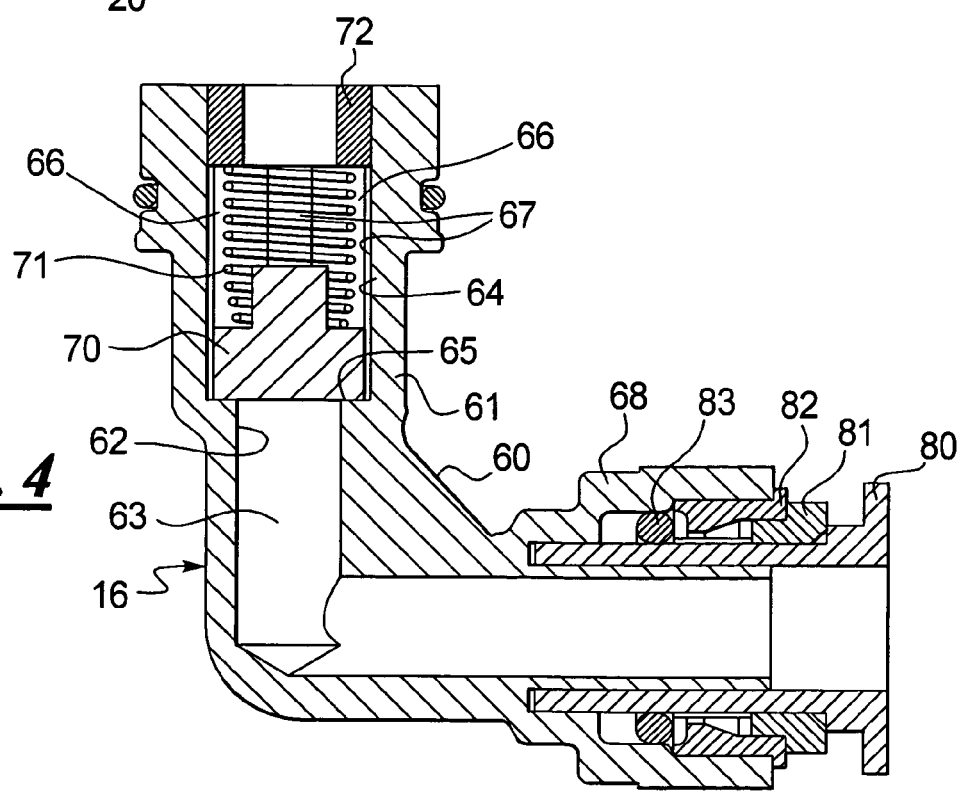
FIG. 4 is a cross-sectional view of an elbow-shaped fitting in accordance with the present invention.

In FIG. 4, an elbow has a molded plastic housing 60, with one branch 61 having a passageway 62 with a first portion 63 and a second portion 64, which form a shoulder 65 facing outward and acting as a valve seat. As in the T-shaped fitting 12 of FIGS. 2 and 3, a valve member 70 is urged against the valve seat 65 by a compression spring 71, which is held in the second portion 64 by the retainer 72. As in the T-shaped fitting 12, the second portion 64 has four keyways or channels 66, which are separated from each other by lands and ribs 67. The lands provide a cylindrical surface which is slightly larger than the cylindrical surface of the valve member 70 and the keyways 66 provide means for the air to flow past the member 70.

As illustrated, the other branch 68 of the housing 60 is provided with coupling members, such as a plug 80, a collet 81, a sleeve 82 and an O-ring 83, similar to the coupling members illustrated in FIG. 2.

In FIG. 5, an embodiment of the elbow fitting 16' is illustrated and has a molded plastic housing 60' with one branch 61' having a passageway 62' with a first portion 63' and a second portion 64' which form a shoulder 65' facing outward and acting as a valve seat. In the embodiment of FIG. 5, a valve member 70', which is a ball made of a synthetic rubber, such as nitrile rubber, is urged by a compression spring 71' against the valve seat 65'. The spring 71' is held in the second portion 64' by a retainer 72'. The second portion 64' has four keyways or channels 66' which are separated from each other by lands or ribs 67'. The lands 67' provide curved guide surfaces which have a diameter slightly larger than the diameter of the valve member or ball 70'. The keyways provide means for the air to flow past the valve member 70' when the valve member is lifted off of the seat 65' by the flow of air in the passage 62'.

Figure 6:
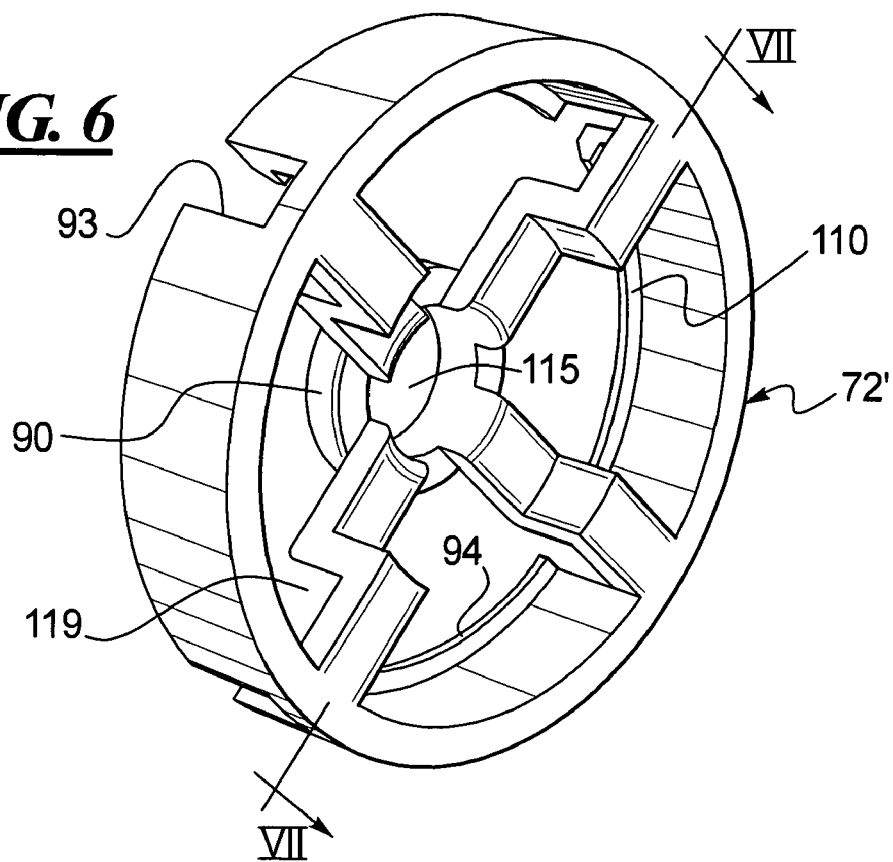
FIG. 6 is a perspective view of an embodiment of the retainer of the present invention.
Figure 7:
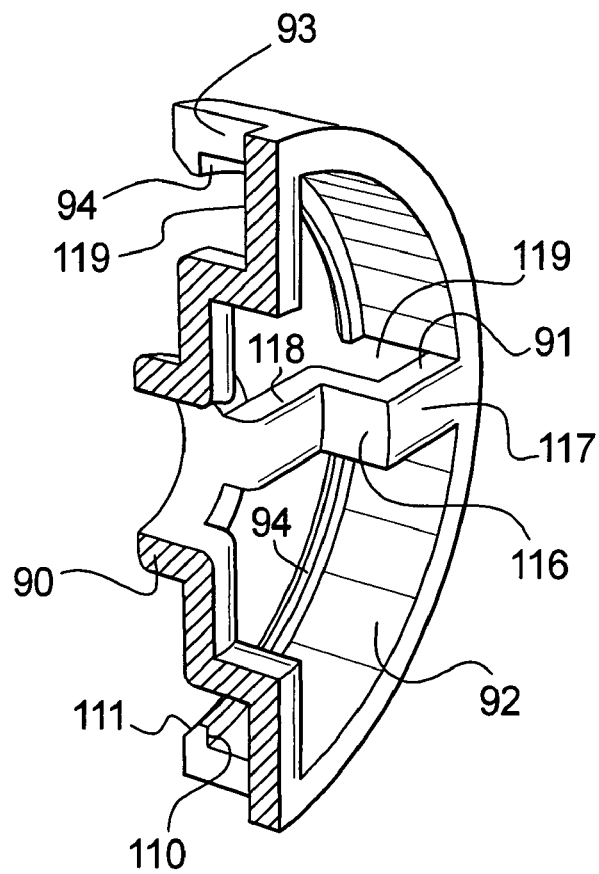
FIG. 7 is a perspective cross-sectional view taken on line VII-VII of FIG. 6.

Instead of being a pressed fit retainer like the retainer 72, the retainer 72', as illustrated in FIGS. 5, 6 and 7, comprises a hub 90 connected by four radial spokes or legs 91 to an outer rim 92. The outer rim is divided into four arcuate sections by notches 93. Each section of the outer rim 92 inward of the spokes 91 has an arcuate catch portion 94 (best shown in FIG. 7) which snaps into a groove 95 on the outer surface of the branch 61'. As illustrated in FIG. 5, the outer surface 61' also includes a second groove 96 receiving an O-ring 97, so that when the branch 61' is inserted into a bushing or an extension 98 of an air tank (not illustrated), a seal is formed therewith and the extension is held on the branch 61' by a snap ring 99 received in a groove 100 of the extension.

As best illustrated in FIG. 7, each catch portion 94 has a substantially radially-extending surface 110 and has a beveled surface 111 which allows it to be pushed onto the end of the branch 61'. As illustrated in FIG. 5, the hub 90 has an opening 115 and acts as a spring guide for the spring 71'. Each of the legs 91 (FIG. 7) has an offset 116 between the portion 117 and the portion 118 to form a groove or space 119 to receive an end portion 121 of the branch 61' when the catch portions 94 are received in the groove 95.

The housing 60' as well as the retainer 72' are formed of plastic material, so that the retainer can easily spring over the end 121 to have the catch portions 94 received in the groove 95.

Another embodiment 16" of the elbow fitting is illustrated in FIG. 8. In this fitting, the housing 60" is machined out of a metal, such as brass. In order to provide the branch 61" with the lands and channels of the invention, an insert 130 is formed and inserted in the second portion 64". The insert has four lands or ribs 67" which are connected by arcuate segments 131 at each end to provide a cylindrical member having the four lands 67" with the channels 66" disposed therebetween. This insert 130 enables a quick and easy formation of the fitting, such as 16" without the added cost of machining the channels into the second portion 64".

While only the elbow-type fittings 16' and 16" are shown utilizing the retainer 72' and the valve member 70', it should be noted that a T-shaped fitting, such as 12, could be modified in the same manner. It is also noted that a T-shaped fitting which was machined out of metal could be provided with the insert 130 to provide the lands, such as 67" with the channels 66".

It should also be noted that while the fittings are either illustrated as being T-shaped or elbow-shaped, the fitting could be a straight member which has an inlet at one end and an outlet with the check valve at the other end.

Although various minor modifications may be suggested by those versed in the art, it should be understood that we wish to embody within the scope of the patent granted hereon all such modifications as reasonably and properly come within the scope of our contribution to the art.

We claim:

1. An air fitting with an integral check valve, said fitting comprising:

a housing having an inlet and at least one outlet, a passage extending between the inlet and the at least one outlet, said passage adjacent the at least one outlet having:

a first portion of a first diameter and a second portion of a second diameter larger than the first diameter to form a valve seat facing the at least one outlet, a valve member being disposed in the second portion, a spring biasing the valve member against the valve seat and a retainer holding the spring in the second portion, said second portion having a plurality of lands separated by channels extending along the length of the second portion with the lands defining a diameter substantially the same as a diameter of the valve member and the channels allowing passage of air to the at least one outlet when the valve member is forced off of the valve seat;

wherein the second portion receives an insert to form the lands and channels and the retainer has inwardly-extending catch portions for engaging an annular groove on an outer surface of the housing adjacent the at least one outlet; and wherein the retainer has a hub portion connected by radially extending arm portions to an outer rim, a portion of the outer rim being divided into arcuate segments containing the inwardly-directed catch portions so that the catch portions can be expanded to shift over the end of the outlet portion and snap into the groove.

2. An air fitting according to claim 1, wherein the housing is a member portion with the lands and channels being integrally formed in said second portion.

3. An air fitting according to claim 1, wherein the housing is machined of metal.

4. An air fitting according to claim 3, wherein the retainer is a molded plastic member.

5. An air fitting according to claim 1, wherein the catch portions have a bevel surface portion to facilitate expanding the arcuate segments of the rim with the catch portions as the retainer is being inserted on the outlet.

6. An air fitting according to claim 1, which has an elbow shape.

7. An air fitting according to claim 6, wherein the retainer is an annular member with an opening forming a press fit in the second portion adjacent the at least one outlet.

8. An air fitting according to claim 6, wherein the valve member is a ball.

9. An air fitting according to claim 6, wherein the valve member is a cylindrical member having a reduced diameter portion forming a guide for receiving one end of the spring.

10. An air fitting according to claim 1, wherein the fitting has the shape of a T-member with a branch extending perpendicular to the main passage.

11. An air fitting according to claim 10, wherein the at least one outlet is in the branch member and the housing is a molded plastic member.

12. An air fitting according to claim 11, wherein the retainer is an annular member press fit into the second portion of the at least one outlet.

13. An air fitting according to claim 11, wherein the valve member is a cylindrical member having a reduced diameter portion forming a spring guide for receiving the spring.

14. An air fitting according to claim 11, wherein the retainer is a molded plastic member having inwardly-extending catch portions for engaging an annular groove on an outer surface of the housing adjacent the at least one outlet.

15. An air fitting according to claim 14, wherein the retainer has a hub portion connected by radially extending arm portions to an outer rim, a portion of the outer rim being divided into arcuate segments containing the inwardly-directed catch portions so that the catch portions can be expanded to shift over the end of the outlet portion and snap into the groove.

16. An air fitting according to claim 15, wherein the catch portions have a bevel surface portion to facilitate expanding the arcuate segments of the rim with the catch portions as the retainer is being inserted on the outlet.

* * * * *